United States Patent
Tonder et al.

(10) Patent No.: US 7,927,037 B2
(45) Date of Patent: Apr. 19, 2011

(54) PERMEABLE PAVER AND MANUFACTURING METHOD THEREFOR

(75) Inventors: Glen Tonder, Hollister, CA (US); Dean R. Tonder, Hollister, CA (US); Tim Donovan, Gilroy, CA (US); Per Jensen, Hollister, CA (US)

(73) Assignee: Pacific Interlock Pavingstone, Inc., Hollister, CA (US)

(*) Notice: Subject to any disclaimer, the term of this patent is extended or adjusted under 35 U.S.C. 154(b) by 56 days.

(21) Appl. No.: 12/537,924

(22) Filed: Aug. 7, 2009

(65) Prior Publication Data

US 2010/0158609 A1 Jun. 24, 2010

(51) Int. Cl.
*E01C 5/00* (2006.01)
(52) U.S. Cl. .......................... 404/44; 106/819
(58) Field of Classification Search .............. 404/34, 404/44; 106/405, 819
See application file for complete search history.

(56) References Cited

U.S. PATENT DOCUMENTS

| | | | | |
|---|---|---|---|---|
| 5,051,023 | A | * | 9/1991 | Yoshida et al. ............. 404/39 |
| 5,230,584 | A | * | 7/1993 | Grossman ................. 404/41 |
| 5,861,205 | A | * | 1/1999 | Murata et al. ............. 428/141 |
| 6,939,077 | B1 | * | 9/2005 | Hart ......................... 404/39 |
| 2005/0238426 | A1 | * | 10/2005 | Seroka et al. ............. 404/34 |
| 2006/0147756 | A1 | * | 7/2006 | Cassar et al. ............. 428/703 |

* cited by examiner

*Primary Examiner* — Gary S Hartmann
(74) *Attorney, Agent, or Firm* — Ray K. Shahani, Esq.; Kin Hung Lai

(57) ABSTRACT

A permeable paver that has water permeability of on average about 1 inch per hour and compressive strength of an average of about 8000 psi, the paver manufactured by forming a mixture comprising blast-furnace slag, sand, gravel and Portland cement into predetermined sizes, shapes and colors as desired utilizing a hydraulic-type or equivalent compacting block forming machine.

5 Claims, 3 Drawing Sheets

PERMEABLE PAVER AND MANUFACTURING METHOD THEREFOR

RELATED APPLICATION(S)

None.

FIELD OF THE INVENTION

This invention relates to permeable pavers and their method of manufacturing, and more particularly to porous pavers that allow moisture to permeate and drain therethrough.

BACKGROUND OF THE INVENTION

Slag has many commercial uses, and is rarely discarded. It is often reprocessed to separate any other metals that it may contain. The remnants of this recovery can be used in railroad track ballast, and as fertilizer. It has been used as a road base material and as a cheap and durable means of roughening sloping faces of seawalls to progressively arrest the movement of waves. Blocks of slag have been used in the construction of retaining walls and foundations.

What was once an unwanted by-product of the steel making process, can now be recycled and used in the manufacture of high performance concretes. When iron ore is heated in a blast furnace, the impurities or 'slag', which include large quantities of calcium and silica, become molten and are separated from the raw iron.

As the slag is channeled out of the furnace, thousands of gallons of water are poured over it. This rapid cooling, often from a temperature of around 2,600° C., is the start of the granulating process. This process causes several chemical reactions to take place within the material, and gives the slag its cementitious properties.

The water carries the slag in its slurry format to a large agitation tank, from where it is pumped along a piping system into a number of gravel based filter beds. The filter beds then retain the slag granules, while the water filters away and is returned to the system.

When the filtering process is complete, the remaining slag granules, which now give the appearance of coarse beach sand, can be scooped out of the filter bed and transferred to the grinding facility where they are ground into particles that are finer than Portland cement This previously unwanted recycled product is used in the manufacture of high performance concretes, especially those used in the construction of bridges and coastal features, where its low permeability and greater resistance to chlorides and sulfates can help to reduce corrosive action and deterioration of the structure.

An interlocking paver is a pre-cast piece of concrete or brick commonly used as an alternative to plain concrete or asphalt or other paving materials. Pavers can be assembled to cover walkways, patios, pool decks and driveways and airport or loading docks. Interlocking pavers are available in a wide range of shapes such as rectangular, hexagonal, etc. and each allows them to be jointed fittingly to create a paving surface. The advantage of using interlocking pavers over the asphalt and poured concrete are high compressive strengths which can reach 7000+psi, pleasant look, time saving, easy removal and relaying etc.

There are quite a few interlocking pavers that are available in the market. They are in different shapes, sizes and made of different materials. Common building materials are concrete and clay; and by adapting different manufacturing methods, pavers of various physical properties can be achieved. For example, pressing the dry concrete-mix into molds rather than pouring a wetter mix allows for their 8000 psi compressive strength, making concrete paving stones a more durable choice than clay bricks or poured-in-place concrete. Clay pavers have an advantage with resistance to fading from the sun and deterioration from long term exposure to the elements. Because clay pavers are fired, the pores of the paver are at least partially vitrified closed, therefore creating an almost non permeable surface. Their main disadvantage is choice of color spectrum. They are a natural material so colors are limited. Concrete also has a limitless color spectrum when starting with white Portland cement and pigments.

Installation of interlocking pavers starts with a compacted stone sub-base and a leveling bed of sand, pavers of desirable size, shape and material. Instead of connecting the pavers by pouring grout between the joints, as one would with tiles, sand particles are spread over the pavers and tamped down. The sand stabilizes the interlocking pavers, yet allows for some flexibility. This type of pavement will absorb stress such as small earthquakes, freezes and thaws, and slight ground erosion by shifting each paver slightly. Therefore, they are less likely to crack or buckle like poured cement.

Due to the increasing environment concerns, however, there has been a upward demand on permeable paving materials, which provide water permeable properties as well as strength for use as paving materials. Permeable paving materials allow moisture to filter through and replenish underground water tables and other water sources. It also helps to drain water into the ground and relieve stress on over taxed storm water systems during high rain conditions.

In the past, concrete pavers have contributed to the LEED ("Green Building") rating system. Originally developed for the U.S. Department of Energy and standing for Leadership in Energy and Environmental Design, LEED is growing in use by design professionals in response to federal, state, and local government agencies, and by private developers. LEED uses a point rating system to recognize sustainable site and building design. Depending upon geographical location due to varying enabling legislation and practice in the different states, complying with the rating system is voluntary and it aims to improve environmental and economic performance of buildings and sites. Developed by consensus with the participation of many organizations, the rating system and certification program based on providing evidence of compliance to the rating system is administered by the U.S. Green Building Council. A complete description and downloads can be found on the Internet at www.usgbc.org/LEED.

Importantly, concrete pavers and permeable interlocking concrete pavers can earn points or "credits" in the LEED rating system. Credits are earned under several categories of use including stormwater management, local/regional materials, and exterior design to reduce heat islands. For stormwater management, Credit 6.1 (1 point) can be earned for building sites where the existing impervious area is greater than 50%. Permeable interlocking concrete pavement can meet this requirement. In some urbanized areas with this extent of impervious cover, permeable interlocking concrete pavement may be more cost-effective than separate water detention and/or retention facilities due to space and configuration constraints. The LEED requirement is that runoff rate and quantity be reduced by at least 25%. In the past, permeable interlocking concrete pavements have been able to reduce runoff to zero for the most frequent storms.

Credit 6.2 provides 1 point for treatment systems designed to remove 80% of the average annual post development total suspended solids (TSS), and 40% of the average annual post development total phosphorus (TP). The ability of permeable interlocking concrete pavements to reduce these pollutants is typically greater than these percentages according to references in the Interlocking Concrete Pavement Institute's manual, Permeable Interlocking Concrete Pavements-Selection, Design, Construction, Maintenance. The ICPI manual references studies on infiltration trenches (similar to permeable pavement bases) and porous pavements with reductions in TSS as high as 95% and TP as much as 70%.

Another source of credit is designated as Credit 5 (1 to 2 points), local regional materials: specify a minimum of 20% of building materials that are manufactured regionally within a radius of 800 km (500 miles). An additional point is earned if 50% of the regionally manufactured materials are extracted, harvested or recovered within this same radius. Most interlocking concrete pavers and permeable pavers will be manufactured within this distance from the project site.

Yet another Credit is 7.1 (1 point), landscape and exterior design to reduce heat islands. An option for meeting this requirement is to use light colored/high albedo materials with a reflectance of at least 0.3 for 30% of the sites non-roof impervious surfaces, i.e., pavements. Concrete paving units can be manufactured in practically any color, so they can be tailored to register an albedo of at least 0.3.

Albedo is defined as the ratio of outbound or reflected solar radiation to inbound radiation. It is measured with a pyranometer. A pyranometer is a type of actinometer used to measure broadband solar irradiance on a planar surface and is a sensor that is designed to measure the solar radiation flux density in watts per square meter from a field of view of 180 degrees. The name pyranometer stems from Greek, "pyr—???" meaning "fire" and "ano—???" meaning "above, sky". A typical pyranometer does not require any power to operate. Long-term measurements should be done with two pyranometers rather than one to better understand and compare diurnal changes in the radiation flux of pavements.

U.S. Pat. No. 6,419,740, issued Jul. 16, 2002 to Kinari et al. teaches a water-permeable solid material which can be used as paving materials. However, the materials are not and cannot be made into paver form. U.S. Pat. No. 6,824,605, issue Nov. 30, 2004 to De Buen-Unna, et al. also teaches ecological permeable concretes with high compression, bending and abrasion resistance for paving purposes but again, the materials are not made into a paver form.

ADVANTAGES AND SUMMARY OF THE INVENTION

The present invention is a paver that has good water permeability and yet strength for use as a paving material. It combines all the advantages of pavers and water-permeable concrete materials and provides an ideal paving material both for indoor and outdoor installations.

One advantage and object of the present invention is the easiness of installation and removal. The mere special tools needed for installing interlocking pavers are vibrating compaction machine or "Vibra Plate" and Shear Cutter. The former is used to compact the base material to 90% density minimum and also to set and interlock the pavers into the sand bed. The latter is used to cut the pieces to fit at corners and edges. The sand does not easily wash out with rain or garden hose water. Since all pavers are ready to be used, no on the spot formulating or mixing of concrete is required.

Another advantage and object of the present invention is to provide a paving material with high compressive strengths of up to 7000+psi as per BS and 8000+psi as per ASTM codes and standards.

Yet another advantage and object of the present invention is to provide environmentally-friendly building materials. Rain water and moisture can permeate and pass through the present invention and reach subterranean water tables. This helps replenish underground water sources and also solves drainage problems in urban as well as rural areas.

Another advantage and object of the present invention is to provide a paving material in compliance with LEED standards and guidelines. In the present case, the present invention is useful for preventing run-off of rain or storm water. As rainwater is absorbed, pollutants are also filtered and removed from the water, thus avoiding the need for storm water collection, retention and treatment facilities. The present invention is also useful for increasing reflectance of solar energy, thus preventing "heat islands" from developing which would alter the environmental impact of development. Due to the ready availability of the materials of construction and ability to utilize existing equipment for manufacturing, the permeable pavers of the present invention can be made and distributed locally.

Yet another advantage and object of the present invention is the aesthetic factors. With the variety of shapes, colors and assembly orientations, designers/installers can easily create a pattern on any surface which is difficult for asphalt and poured cement.

Further details, objects and advantages of the present invention will become apparent through the following descriptions, and will be included and incorporated herein.

DETAILED DESCRIPTION OF THE PREFERRED EMBODIMENT

Figure 1:
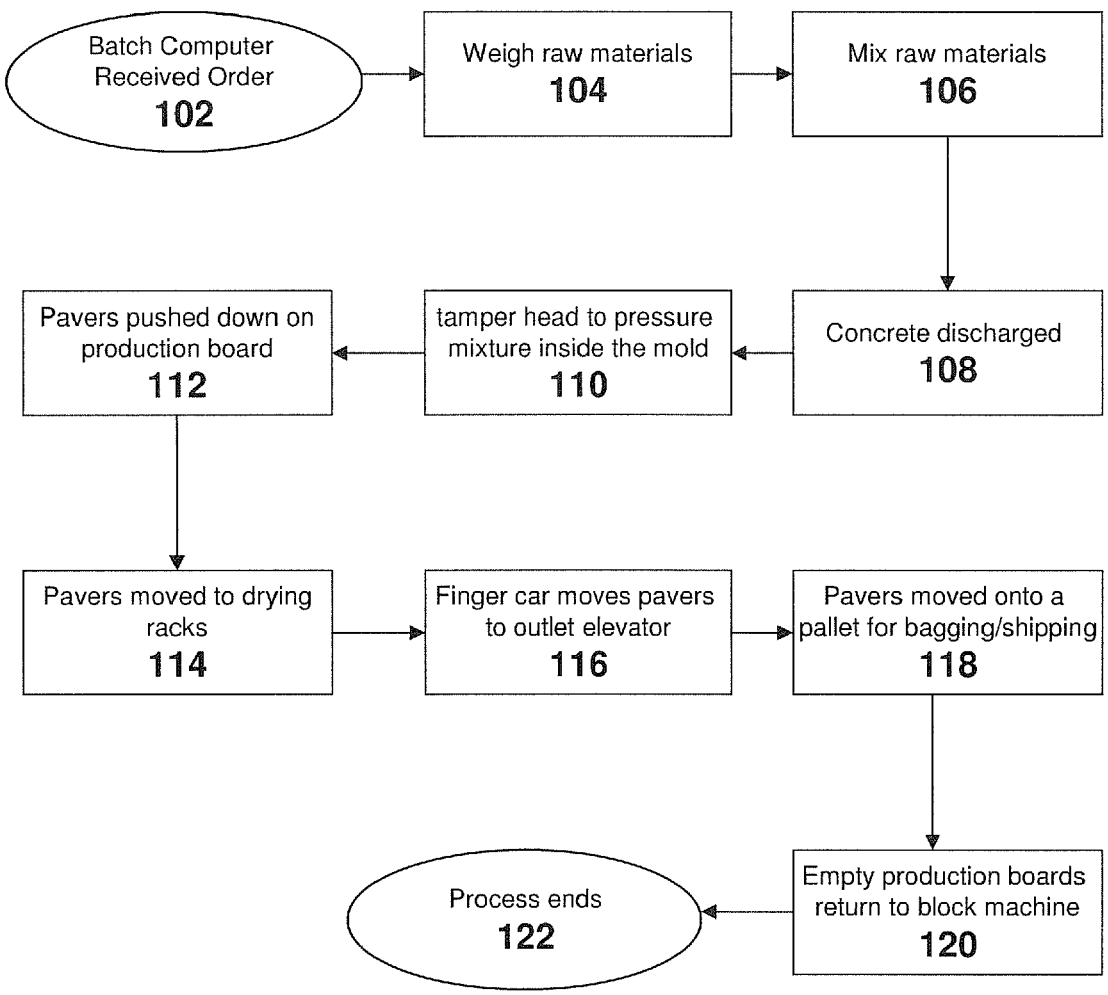
FIG. 1 is a flowchart showing the steps of manufacturing permeable paver 100 of the present invention.

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

FIG. 1 is a flowchart showing the steps of manufacturing permeable paver 100 of the present invention. In Step 102, the process starts off as the Batch Computer receives an order to make a load of permeable paver 100.

In Step 104, raw materials that consist of blast slag, sand, gravel, optionally a color agent, cement and water are pre weighed according to the order quantity, desired physical properties and shapes of permeable paver 100.

The following table shows experimentally utilized mix design test formulae for the permeable paver 100 of the present invention.

TABLE 1

Mix Design for Permeable Paver 100

| Mix Design | Value in kg | | | | | | |
|---|---|---|---|---|---|---|---|
| | 20% (¼ Gravel) | 25% | 30% | 35% | 40% | 45% | 50% |
| 15% (Cement) | | | | | | | |
| Slag | 600 | 600 | 600 | 600 | 600 | 600 | 600 |
| ¼ gravel | 160 | 200 | 240 | 280 | 320 | 360 | 400 |
| Sand | 200 | 200 | 200 | 200 | 200 | 200 | 200 |
| Cement | 144 | 150 | 156 | 162 | 168 | 174 | 180 |
| 16% | | | | | | | |
| Slag | 600 | 600 | 600 | 600 | 600 | 600 | 600 |
| ¼ gravel | 160 | 200 | 240 | 280 | 320 | 360 | 400 |
| Sand | 200 | 200 | 200 | 200 | 200 | 200 | 200 |
| Cement | 153.6 | 160 | 166.4 | 172.8 | 179.2 | 185.6 | 192 |
| 17% | | | | | | | |
| Slag | 600 | 600 | 600 | 600 | 600 | 600 | 600 |
| ¼ gravel | 160 | 200 | 240 | 280 | 320 | 360 | 400 |
| Sand | 200 | 200 | 200 | 200 | 200 | 200 | 200 |
| Cement | 163.2 | 170 | 176.8 | 183.6 | 190.4 | 197.2 | 204 |
| 18% | | | | | | | |
| Slag | 600 | 600 | 600 | 600 | 600 | 600 | 600 |
| ¼ gravel | 160 | 200 | 240 | 280 | 320 | 360 | 400 |
| Sand | 200 | 200 | 200 | 200 | 200 | 200 | 200 |
| Cement | 172.8 | 180 | 187.7 | 194.4 | 201.6 | 208.8 | 216 |
| 19% | | | | | | | |
| Slag | 600 | 600 | 600 | 600 | 600 | 600 | 600 |
| ¼ gravel | 160 | 200 | 240 | 280 | 320 | 360 | 400 |
| Sand | 200 | 200 | 200 | 200 | 200 | 200 | 200 |
| Cement | 182.4 | 190 | 197.6 | 205.2 | 212.8 | 220.4 | 228 |
| 20% (Cement) | | | | | | | |
| Slag | 600 | 600 | 600 | 600 | 600 | 600 | 600 |
| ¼ gravel | 160 | 200 | 240 | 280 | 320 | 360 | 400 |
| Sand | 200 | 200 | 200 | 200 | 200 | 200 | 200 |
| Cement | 192 | 200 | 208 | 216 | 224 | 323 | 240 |
| 21% | | | | | | | |
| Slag | 600 | 600 | 600 | 600 | 600 | 600 | 600 |
| ¼ gravel | 160 | 200 | 240 | 280 | 320 | 360 | 400 |
| Sand | 200 | 200 | 200 | 200 | 200 | 200 | 200 |
| Cement | 201.6 | 210 | 218.4 | 226.8 | 235.2 | 243.6 | 252 |

Materials:

The following materials may be used and are presented here as examples only. Slag: Granulated Blast-Furnace Slag (GGBFS), which has been sieved to remove particles larger than ³⁄₁₆" with sieve size #4; ¼" Gravel: Crystalline Silica (Aggregate); and Cement: Permanent Type 1-2-3-5; and white cement.

Supplementing the formulae or process for manufacturing the permeable pavers of the present invention can provide control over permeability. It will be understood that while materials including addmix and fly ash are commonly used with concrete objects, their use in the permeable pavers of the present invention will provide the manufacturers with a tool for limiting or decreasing permeability, in the event of, for example, a level, uniform, maximum 1" per hour rate of water permeation is desired. It will be understood, however, that there will be a limiting factor on the permeability of the pavers 100 of the present invention through use of these materials.

Thus, the pavers of the present invention are composed of (i) a base of 3 parts by weight of slag and 1 part by weight of sand, (ii) between about 20% and about 50% by weight of gravel, and (iii) between about 15% and about 21% Portland-type or equivalent cement. These formulations are best suited for preparation of a paver 100 of the present invention having compressive strength of minimum 8000 psi, the ASTM requirement for building pavers. Moreover, permeability of the present paver 100 is greater than 1" per hour, and the LEED standard requires at least 1" per hour permeability. To determine the entire volume of water flow through the permeable pavers 100, the area of the paver can be used to determine the overall volumetric flow through the paver.

In Step 106, when all raw materials are weighed and ready, blast slag, sand and gravel will be poured into the mixer, followed by cement, optionally a color agent, and water. The mixing time is approximately 3 minutes. Water is added to attain desirable consistency of the entire mixture and the amount of water used depends upon the amount of moisture in the materials, humidity and other factors during the mixing process. Coloring and pigmentation is added as desired.

In Step 108, the mixture in the mixer is discharged onto a conveyor to the block machine hopper. The hopper opens loading filling box. The filling box will then travels over the mold for permeable paver 100, filling the entire internal chamber of the mold with or without vibration/shaking.

In Step 110, the tamper head comes down to pressure the mixture inside the mold with approximately 30 bars pressure and the mold with vibration lasting for about 2 seconds.

In Step 112, the mold rises as the tamper head pushes the permeable paver 100 down onto a production board. The production board is then pushed onto a conveyor and accumulated onto the inlet elevator.

In Step 114, the inlet elevator fills and the finger car picks up the batch of permeable pavers 100 and moves to the drying racks.

In Step 116, the finger car then transfers a cured load of permeable paver 100, to the outlet elevator.

In Step 118, the production boards are conveyed to the cuber. Therein they will pick up the batch of permeable pavers 100 and move it onto a pallet for bagging and shipping.

In Step 120, the now empty production boards will return to the block machine and the process ends.

Equipment useful for manufacturing the pavers of the present invention is known and existing. As an example equipment manufactured by KVM International in Denmark, located online at www.KVM.com for the precast concrete industry are particularly well suited for manufacturing the permeable pavers of the present invention. Block forming machines are known in the prior art and will be incorporated herein by reference. As an example, the catalog entitled Machines for the Precast Concrete Industry regarding equipment manufactured by KVM International includes equipment including but not limited to Blockmachine, Series I Type 62/62, Blockmachine, Series I Type 62/80 and 62/97, Blockmachine, Series II Type 62/105, 90/105 and 62/125, Blockmachine, Series III Type 80/125, 105/125, 125/125, Control for Blockmachines PLC/PC, version 3, Cubing Systems Type M80/120, H120, HS 140 and associated Handling Systems.

A typical cement that can be used is manufactured by Lehigh Portland Cement Company under product name ALLCEM CEMENT. Material Safety Data Sheet describes the components of the cement as having about 30-45% hydrated amorphous silica, about 30-45% calcium compounds, about 8-15% magnesium compounds, about 5-15% aluminum compounds, about 0-4% sulfur, about 0-1% of the following: iron, titanium, manganese and potassium compounds, and about 0-0.2% crystalline silica. Other cements manufacturers and types will be known to those skilled in the art.

Blast-furnace slags are well known. Ground granulated blast-furnace slag or equivalent can be used in the present invention.

Figure 2:
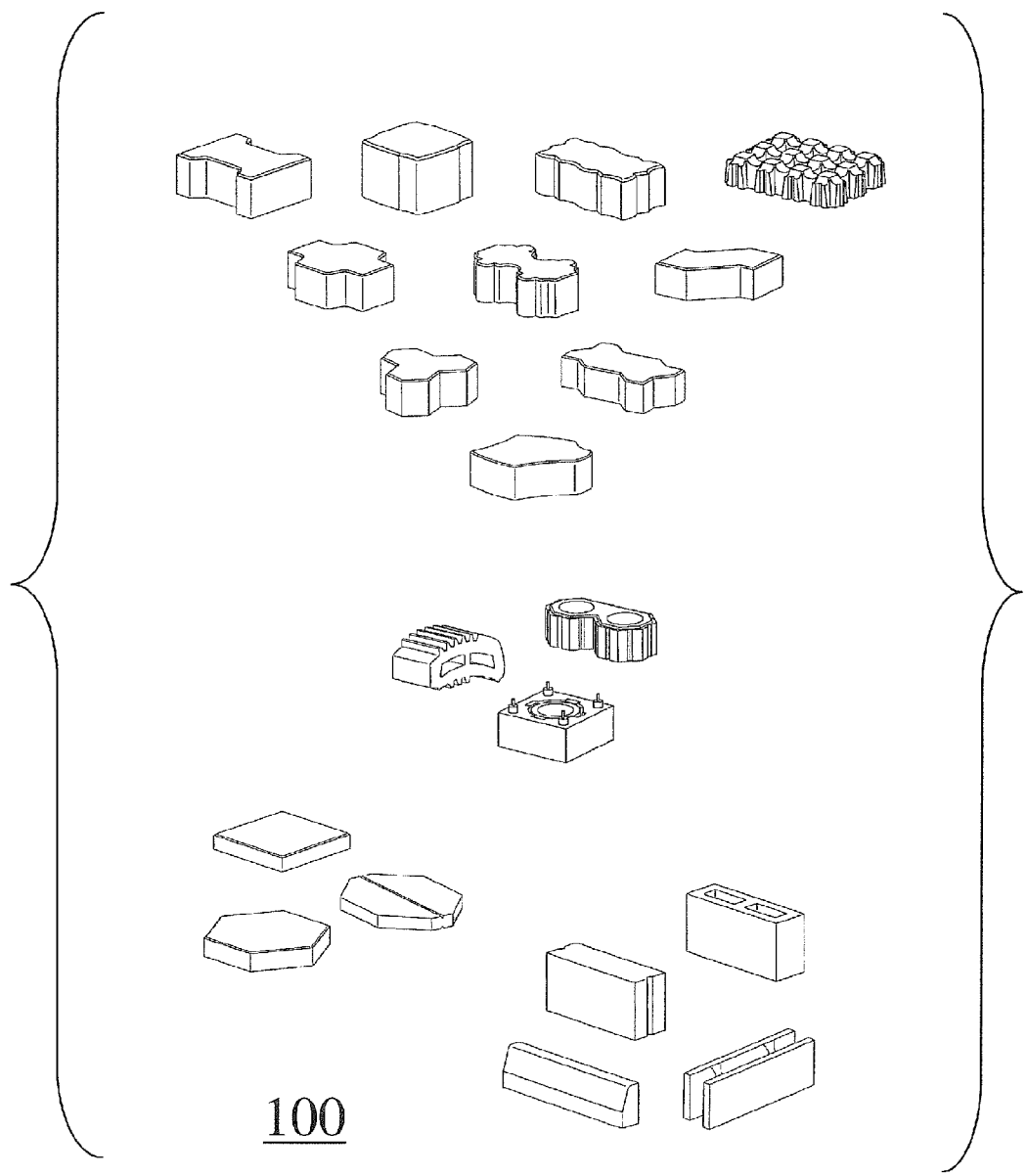
FIG. 2 is a representative drawing showing possible sizes and shapes for permeable pavers 100 of the present invention.

FIG. 2 is a representative drawing showing the possible sizes and shapes for permeable pavers of the present invention. It will be understood that pavers can be formed having square or rectangular and trapezoidal or hexagonal or other multi-sided shapes. Additionally, pavers can be made to increase drainage by having spacer tabs or bars integrally formed therein, and can be interlocking or fitted together as desired. Various shapes and sizes will be known to those skilled in the art.

EXPERIMENTAL TEST RESULTS

Figure 3:
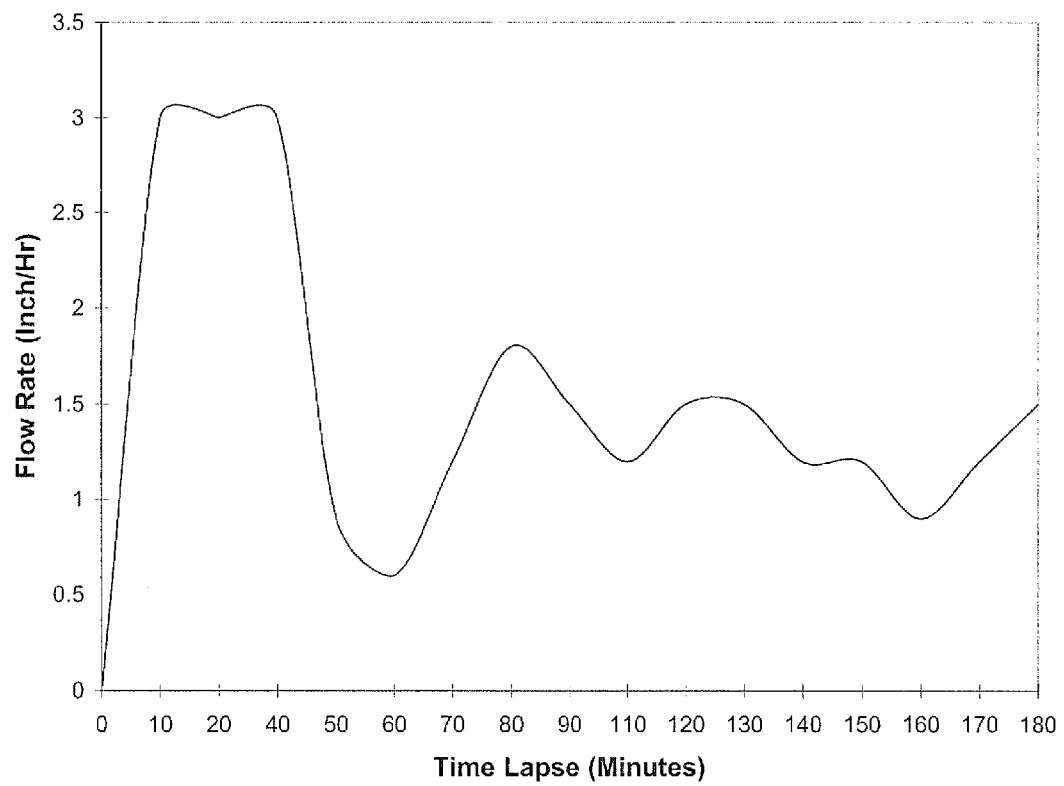
FIG. 3 is a chart showing experimental test results of water flow rate through the permeable paver 100 of the present invention.

FIG. 3 is a chart showing experimental test results of water flow rate through the permeable paver 100 of the present invention.

Test Set Up:

Permeable pavers 100 of the present invention are installed on a bed of sand/gravels, emulating the actual application. Edges of permeable pavers 100 are water sealed to each other and to the perimeter with silicon or other elastomeric and sealing material to ensure moisture is flowing through the pavers 100 themselves, and not around or through holes/gaps between them. A water collection tank of the exact same dimensions is placed directly underneath permeable pavers 100. Water is poured on top of the permeable pavers 100 continuously. Water starts to flow through permeable pavers 100 and is collected in the water collection tank. The total depth of water collected was then measured periodically over time, from 0 minutes to 180 minutes at a period of 10 minutes. The differences between consecutive measurements is equivalent to the amount of flow over the respective 10-minute period. The flow per hour during any given 10-minute period is then known. It will be understood that by deleting a statistically few test data points due to their apparent error or otherwise unusual deviation from average, smoother data curves can be obtained. Other techniques for calculating and graphing smoothed averages will be known by those skilled in the art.

The following table shows experimentally obtained test results for the permeable paver 100 of the present invention.

TABLE 2

Experimental Test Results for Permeable Paver 100

| Time lapse (Minutes) | Water collected (Inches) | Flow rate (Inches/hour) |
|---|---|---|
| 0 | 0 | 0 |
| 10 | 0.5 | 3 |
| 20 | 0.5 | 3 |
| 30 | 0.25 | 1.5 |
| 40 | 0.5 | 3 |
| 50 | 0.15 | 0.9 |
| 60 | 0.1 | 0.6 |
| 70 | 0.2 | 1.2 |
| 80 | 0.3 | 1.8 |
| 90 | 0.25 | 1.5 |

TABLE 2-continued

Experimental Test Results for Permeable Paver 100

| Time lapse (Minutes) | Water collected (Inches) | Flow rate (Inches/hour) |
|---|---|---|
| 100 | 0.05 | 0.3 |
| 110 | 0.2 | 1.2 |
| 120 | 0.25 | 1.5 |
| 130 | 0.25 | 1.5 |
| 140 | 0.2 | 1.2 |
| 150 | 0.2 | 1.2 |
| 160 | 0.15 | 0.9 |
| 170 | 0.2 | 1.2 |
| 180 | 0.25 | 1.5 |

As shown in FIG. 3, during the initial period the flow rate is irregular as water commences filling holes and pores in the permeable pavers 100. After permeable pavers 100 are fully loaded with water, the flow rate will immediately increase, then drop back down to become more steady and average at around 1.2 to 2.0 inches per hour. It will be understood that this level of permeability exceeds that required by industry standards.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

We claim:

1. A permeable paver formed into a predetermined size and shape utilizing a hydraulic-type compacting block forming machine, the permeable paver comprising (i) a base of 3 parts by weight of blast-furnace slag and 1 part by weight of sand, (ii) between about one fifth and one half part by weight of ¼" gravel, (iii) between 15 and 21 parts by weight Portland cement, the paver having a water permeability in excess of 1 inch per hour and having an average compressive strength in excess of about 8000 psi.

2. The permeable paver of claim 1, further comprising spacer bars and/or grooves located peripherally thereon to increase absorption between pavers.

3. The permeable paver of claim 1, further comprising one or more color agents.

4. The permeable paver of claim 1, wherein the blast-furnace slag is ground and/or granulated.

5. The permeable paver of claim 4 in which the blast-furnace slag is pre-processed through an industry standard 3/16" No. 4 sieve.

* * * * *